(12) United States Patent
Flannery et al.

(10) Patent No.: US 6,456,491 B1
(45) Date of Patent: Sep. 24, 2002

(54) MODULAR FLOPPY DISK DRIVE FOR INTERNAL AND EXTERNAL USE

(75) Inventors: Michael R. Flannery, Sioux City, IA (US); Stephen Vossler, Sioux Falls, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 08/599,680

(22) Filed: Feb. 12, 1996

(51) Int. Cl.[7] .............................. G06F 1/16; H05K 7/00
(52) U.S. Cl. ...................... 361/685; 361/725; 439/638
(58) Field of Search ...................... 364/708.1; 439/638; 361/683–686, 725–727

(56) References Cited

U.S. PATENT DOCUMENTS

| | | | | |
|---|---|---|---|---|
| 4,833,554 A | 5/1989 | Dalziel et al. | ........... | 360/98.04 |
| 4,893,210 A | 1/1990 | Mintzlaff | ................ | 360/137 |
| 4,941,481 A | 7/1990 | Darden et al. | ............. | 361/685 |
| 4,982,303 A | 1/1991 | Krenz | .................... | 360/137 |
| 5,041,924 A | 8/1991 | Blackborow et al. | ......... | 360/69 |
| 5,142,447 A | * 8/1992 | Cooke et al. | ................ | 361/685 |
| 5,155,663 A | * 10/1992 | Harase | ................ | 361/684 |
| 5,211,459 A | 5/1993 | Wu | .......................... | 312/223.2 |
| 5,229,919 A | 7/1993 | Chen | ........................ | 361/685 |
| RE34,369 E | 9/1993 | Darden et al. | ............. | 439/377 |
| 5,299,944 A | 4/1994 | Larabell et al. | ............. | 439/157 |
| 5,319,519 A | 6/1994 | Sheppard et al. | ........... | 361/685 |
| 5,398,158 A | 3/1995 | Fisher et al. | ................ | 361/685 |

FOREIGN PATENT DOCUMENTS

| | | | | |
|---|---|---|---|---|
| EP | 426414 | * 5/1991 | ................ | 361/685 |
| JP | 4-55918 | 2/1992 | ............ | G06F/1/16 |
| JP | 4-155415 | 5/1992 | ............ | G06F/1/16 |
| JP | 6-75661 | 3/1994 | ............ | G06F/1/16 |

* cited by examiner

*Primary Examiner*—Lynn D. Feild
(74) *Attorney, Agent, or Firm*—Mark Walker; Rodney L. Lacy; Schwegman Lundberg Woessner & Kluth (57) ABSTRACT

A modular floppy disk drive is designed to stand alone as an external drive or to be combined with a carrier to fit into a computer peripheral option bay configured for removable CD ROM drives. When used as an external floppy disk drive, the modular unit is connected to the personal computer through a connector and cable assembly. The carrier adapts the modular drive to the size and mechanical requirements of the peripheral option bay so that the modular unit can be inserted into the computer and used as an internal floppy disk drive.

28 Claims, 5 Drawing Sheets

MODULAR FLOPPY DISK DRIVE FOR INTERNAL AND EXTERNAL USE

FILED OF THE INVENTION

The present invention is related to computer systems and in particular to a floppy disk drive that functions as both an internal and external disk drive.

BACKGROUND OF THE INVENTION

Until recently, software for personal computers was distributed on floppy disks, usually 3.5" floppies. Now, however, as the price of CD ROM technology has decreased and the size of program code has increased, a majority of software companies are moving to higher data density CD ROM's as the preferred distribution media. Despite the increased use of CD ROM's by software vendors, many computer users still prefer a floppy disk for such tasks as loading small programs, exchanging data with other users, and backing up critical files. Therefore, computer manufacturers continue to offer floppy disk drives as either standard or optional equipment on computer systems. In the case of portable computers, including both a floppy drive and a CD ROM drive poses difficult choices for the manufacturer and the user due to the limited space available in the portable computer case and the need to make the portable computer as light as possible.

If the portable computer has a built-in floppy drive, little or no room is left to include a CD ROM drive. If the CD ROM drive is built-in and the floppy drive is offered as an external option, the user must carry the floppy drive and its cabling along with the computer when traveling. A recently introduced alternative allows the user to interchange a removable CD ROM drive and a removable floppy disk drive in the same computer bay. One drawback with this last approach is that the normally small floppy disk drive must be enclosed in a casing that conforms to the CD ROM form factor size and mechanical requirements. Therefore, if a user wishes to have both CD ROM and floppy disk capabilities while traveling, one of the large drives must be carried externally. An additional drawback is that only one of the drives may be used at any one time. One way to eliminate these drawbacks is to also purchase a portable external drive to be used when both floppies and CD ROM's are needed simultaneously. However, if the user does not want to spend the additional money to have both removable and portable floppy disk drives, then the user must decide between the portable external floppy drive or the removable floppy drive. This decision is based in part on predicting how frequently the user will need the floppy drive over the life of the computer and is thus often regretted as the user's needs change.

For the manufacturer, the current solutions to the problem of providing internal and external floppy disk drives with portable computers require it to maintain two separate floppy disk drive units in inventory, one for internal use and one for external use, resulting in higher inventory costs.

SUMMARY OF THE INVENTION

A modular 3.5" floppy disk drive (FDD) is externally attachable to a computer and, when combined with an appropriate form factor carrier, is insertable into a computer peripheral option bay configured for other types of removable drives so that it functions as an internal drive.

A standard FDD unit is enclosed in a modular shell suitable for external use. The FDD unit has data/control lines coupled to an electrical connector fixed in the shell. The electrical connector is designated as a shell adaptor connector. A cable couples to the shell adaptor connector to attach the modular FDD to the computer through either a proprietary or standard interface, such as a parallel port or PCMCIA slot, when the modular FDD is being used externally.

For internal use, the modular FDD is inserted into a carrier that acts as a form factor adaptor to make the modular FDD compatible with the size and mechanical requirements of a computer peripheral option bay configured for a removable CD ROM drive. When the modular FDD is inserted into the carrier, the shell adaptor connector couples to a corresponding electrical connector on the inside of the carrier. Another electrical connector is molded into the outside of the carrier and has the physical configuration of a connector on the removable CD ROM drive. The inside and outside electrical connectors are coupled together so that the FDD data/control signals are routed from the inside electrical connector to the appropriate electrical contacts of the outside electrical connector and complete an electrical connection between the FDD unit and the computer when the carrier holding the modular FDD is inserted into the peripheral option bay. The computer determines the type of device inserted into the peripheral option bay by reading signals sent by the device on certain of its data/control lines.

The carrier itself is substantially U-shaped in cross-section with the modular FDD fitting into an open-mouthed slot formed between the legs of the U. In an alternate embodiment, latching tabs at the open end of the slot exert tension on the modular FDD to hold it in the carrier. The latching tabs have different shapes and grooves on the outside of the legs of the shell are keyed to the tabs so that the modular FDD can be inserted into the carrier in only one orientation.

In one embodiment, the shell adaptor connector is a shrouded DB25 male connector and the inside electrical connector is a DB25 female connector. Because the DB25 connectors can be coupled in only one orientation, their use forces the user to insert the drive into the carrier correctly. The shroud of the DB25 male connector fitting around the DB25 female connector also aids in achieving a firm electrical connection between the modular FDD and the carrier.

In still another alternate embodiment, a good electrical connection between the modular FDD and the carrier is ensured by recessing the inside electrical connector into the carrier so that the shell adaptor connector fits tightly into the recess and is unlikely to work loose when coupled to the inside electrical connector.

A circuit to reduce electromagnetic interference is disclosed in another embodiment. An electrical grounding contact is molded into the modular shell which is coupled to a corresponding grounding point on the FDD unit. A metal plate is attached to the carrier and makes contact with the grounding contact when the modular FDD is inserted into the carrier. The metal plate is grounded to the computer chassis when the carrier is inserted into the computer bay.

In still other embodiments, the modular FDD is used as an external device by coupling one end of a cable to the shell adaptor connector on the modular FDD. The opposite end of the cable is terminated with a connector, such as a PCMCIA card connector or a standard parallel port connector, which is further coupled to the appropriate interface on the computer. A further alternate embodiment comprises a substantially L-shaped carrier having the same electrical connections as the substantially U-shaped carrier.

The ability to interface a single modular FDD to a computer both internally and externally saves the user money by combining two functions into one unit. A standard FDD unit is surrounded by a shell to protect it from damage when being used externally. Because the carrier acts as a form factor adaptor, the carrier provides the size and mechanical interfaces required by the peripheral option bay when the modular FDD is being used internally. Therefore, the shell surrounding the FDD unit can be almost as small as the FDD unit, making it very portable and easy to carry when the user is on the road and needs the peripheral option bay for other devices while still having access to floppies. Alternatively, if the user will not need the CD ROM drive while on the road, the modular FDD and carrier combination can be inserted into the computer bay, giving the user maximum portability. Furthermore, because the modular FDD operates either internally or externally, the user does not have to purchase two separate units to get both functions, nor decide in advance how frequently the FDD will be used over several years. Finally, since the modular FDD is usable without the carrier, the carrier can be made a separately purchased item thereby giving the user the option of upgrading to internal use later, and allowing the manufacturer to reduce its inventory to a single type of FDD.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds digits corresponding to the figure number, with the exception that the same components may appear in multiple figures identified by the same reference numbers.

Figure 1A:
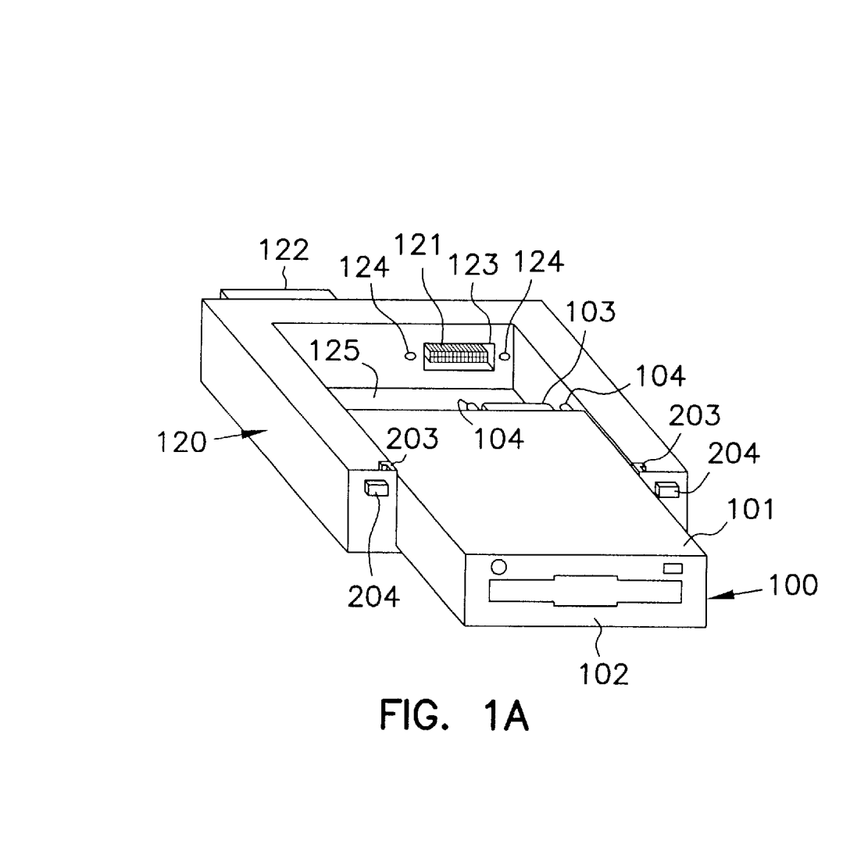
FIG. 1A is a perspective view of a modular floppy disk drive showing it partially inserted into a carrier.
Figure 1B:
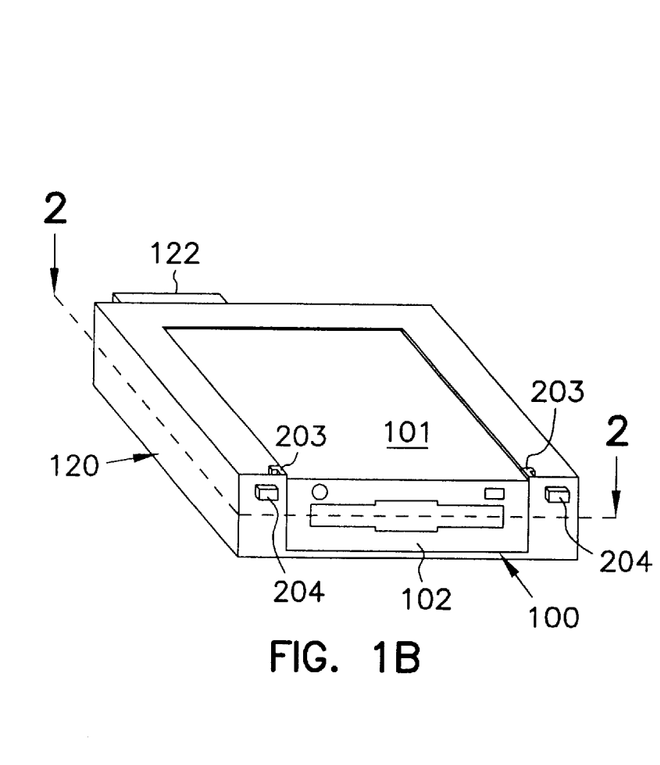
FIG. 1B is a perspective view of the modular floppy disk drive showing it fully inserted into the carrier

FIG. 1A is a perspective view of a modular floppy disk drive (FDD) 100 partially inserted into a carrier 120; FIG. 1B is the same perspective after the FDD 100 has been completely inserted into the carrier 120. The carrier 120 is substantially U-shaped, having two legs and a base cross piece connecting the two legs. The open-mouthed slot formed between the two legs is sized to fit the modular FDD 100. The carrier 120 is manufactured through injection molding using rigid, lightweight plastic.

The modular FDD 100 comprises a standard slimline 3.5" FDD unit 102, similar to model MD2661 from Canon Electronics, Inc., which is encased in a hard plastic shell 101 to protect it from contaminants and damage when transported or used as an external drive. The shell 101 is molded around the FDD unit 102 or manufactured in sections that screw or latch together to enclose the FDD unit. In a further embodiment, the shell 101 is "ruggedized" to meet U.S. military requirements if sold into that marketplace. Additional methods of enclosing the FDD unit 102 will be apparent to those skilled in the art, as will the use of alternate materials and manufacturing methods for making the shell 101 and the carrier 120.

The data/control lines from the FDD unit 102 are wired to a shell adaptor connector 103 molded into the shell 101. The shell adaptor connector 103 interfaces with a cable (shown in FIG. 4) to attach the drive to a computer as an external device. For internal use of the FDD in a computer peripheral option bay, the shell adaptor couples with a corresponding electrical connector 121 molded inside the carrier 120. The inside electrical connector 121 is coupled to another electrical connector 122 molded on the outside of the carrier 120.

In one alternate embodiment, shell adaptor connector 103 is a standard shrouded DB25 male connector. When the modular FDD is being used externally, the cable (shown in FIG. 4) is terminated on one end with a standard DB25 female connector and a retention mechanism built into the standard DB25 connectors prevents accidental disconnection of the cable from the modular FDD. The retention mechanism comprises two securing screws on the DB25 female connector that fasten into two threaded receptors 104, known as "female screwlocks", affixed to, or integrated into, the DB25 male connector. When the modular FDD is inserted into the carrier, the female screwlocks 104 on the DB25 male connector 103 fit into receiving holes 124 molded into the carrier 120, and the DB25 male connector 103 couples with the inside electrical connector 121 which is a DB25 female connector without securing screws. Because the DB25 connectors can be coupled in only one orientation, their use forces the user to insert the drive into the carrier correctly. The shroud of the DB25 male connector as it fits around the DB25 female connector also aids in achieving a firm electrical connection between the drive and the carrier. Other types of D-shell connectors common in the industry, such as high-density SCSI-2 connectors, also couple in only one orientation and provide the same benefits as the DB25 connectors.

In still another embodiment, the carrier 120 and outside electrical connector 122 conform with the size and mechanical form factor requirements of a removable 5.25" half height CD ROM drive, such as a Gateway 2000 model P3C CDROM 2X, which is designed for use in a computer peripheral option bay configured to connect the removable CD ROM drive to the computer. The computer determines the type of device inserted into the peripheral option bay by reading signals sent by the FDD unit 102 on certain of its data/control lines, known in the art as sense lines. Once the computer identifies the device as a floppy disk drive, it reads from and writes to the proper data/control lines for a floppy disk drive, and routes the signals from the FDD unit onto its appropriate internal lines for processing.

A peripheral option bay configured for a removable CD ROM drive contains an internal drive connector that couples with a corresponding electrical connector on the CD ROM drive. The internal drive connector is called a "blind-mate" connector because the user cannot see the internal drive connector when inserting a device into the peripheral option bay. A blind-mate connector is often formed with chamfered sides that act as alignment guides for coupling with a suitably chamfered second connector. Thus, in an alternate embodiment of the present invention, the outside electrical connector 122 is shaped to match a chamfered, blind-mate internal drive connector in the computer peripheral option bay so that the carrier 120 is guided into proper alignment with the internal drive connector when it is inserted into the peripheral option bay.

FIG. 1A also illustrates an alternate way to secure the modular FDD 100 in the carrier 120 by embedding the inside electrical connector 121 within a recess 123 molded on the inside of the carrier 120.

Use of other form factors, types of connectors, different locations for the connectors on the shell and carrier, and alternate means of attaching the connectors to the shell and carrier will be apparent to those skilled in the art upon reading the above description. Also, the use of alternate materials and manufacturing methods for making the shell 101 and the carrier 120 will suggest other means of securing the modular FDD 100 in the carrier 120 to those skilled in the art.

Figure 2:
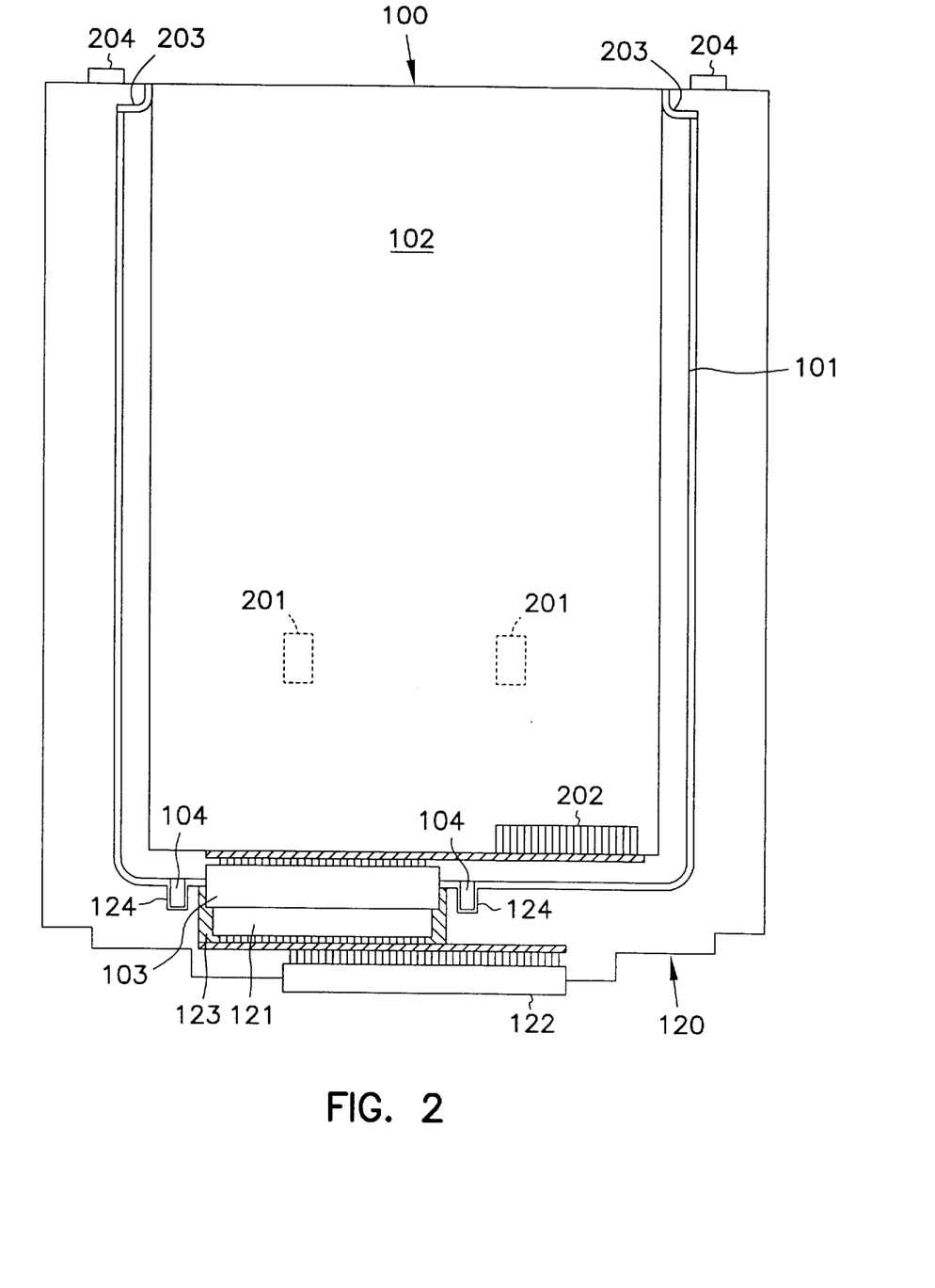
FIG. 2 is a sectional view taken along line 2—2 in FIG. 1B showing the electrical connections between the modular floppy disk drive and the carrier.

Still another embodiment is illustrated in FIGS. 1A and 2 which show a circuit to reduce electromagnetic interference in the modular FDD 100. A metal plate 125 is attached to the carrier 120 to make contact with grounding contacts 201 molded into the shell 101. The grounding contacts 201 are coupled to grounding points on the FDD unit 102 enclosed in the shell 101. The plate 125 completes a grounding circuit with the computer chassis when the carrier 120 is inserted into a peripheral option bay configured with corresponding grounding points. This arrangement also improves the quality of the signals exchanged between the computer and the floppy disk drive unit. Alternate ways of reducing the electromagnetic interference and/or improving signal quality, such as the use of grounded connector shrouds or grounding wires in the connectors, will be readily apparent to those skilled in the art.

FIG. 2 shows one method of coupling the various electrical connections of the modular FDD 100 and the carrier 120. The data/control lines 202 from the standard FDD unit 102 are connected to the shell adaptor connector 103 on the modular FDD 100 through a PCB board. Similarly, the carrier's inside electrical connector 121 is connected to the outside electrical connector 122 through a second PCB board. PCB boards are frequently used in the computer industry for coupling electrical connectors together when they are off-set from one another or have differing configurations, but alternate methods will also be apparent to those skilled in the art and the disclosure should not be read as requiring the use of PCB boards or as limiting the invention to a specific arrangement of connectors.

FIG. 2 also illustrates an alternate method of securing the modular FDD 100 in the carrier 120. Spring-loaded latching tabs 203 on the carrier 120 bias the modular FDD 100 into the middle of the carrier 120. When pressed, latch release buttons 204 retract the latching tabs 203 to release the modular FDD 100 from the carrier 120. As spring-loaded latches and latch release mechanisms are commonly used with VCR's, cassette recorders, and removable storage units for computers, the functioning of these elements is not discussed further.

In an alternate embodiment, the latching tabs 203 have different shapes keyed to corresponding grooves in the shell 101 such that the modular FDD 100 can be inserted into the carrier 200 only in the proper orientation. For example, the latching tabs on one side of the carrier are cubical, those on the other side semi-spherical, and the grooves on the shell are then formed to mate with the correct tabs. In yet another embodiment, the user inserts the modular FDD 100 in the open top of the carrier 200. Once the DB25 connectors 103 and 121 are in contact, the user pushes the modular FDD 100 simultaneously back and down into the carrier so that the latching tabs 203 snap into notches molded into the shell 101. The modular FDD 100 is removed from the carrier by reversing the insertion steps.

Figure 3:
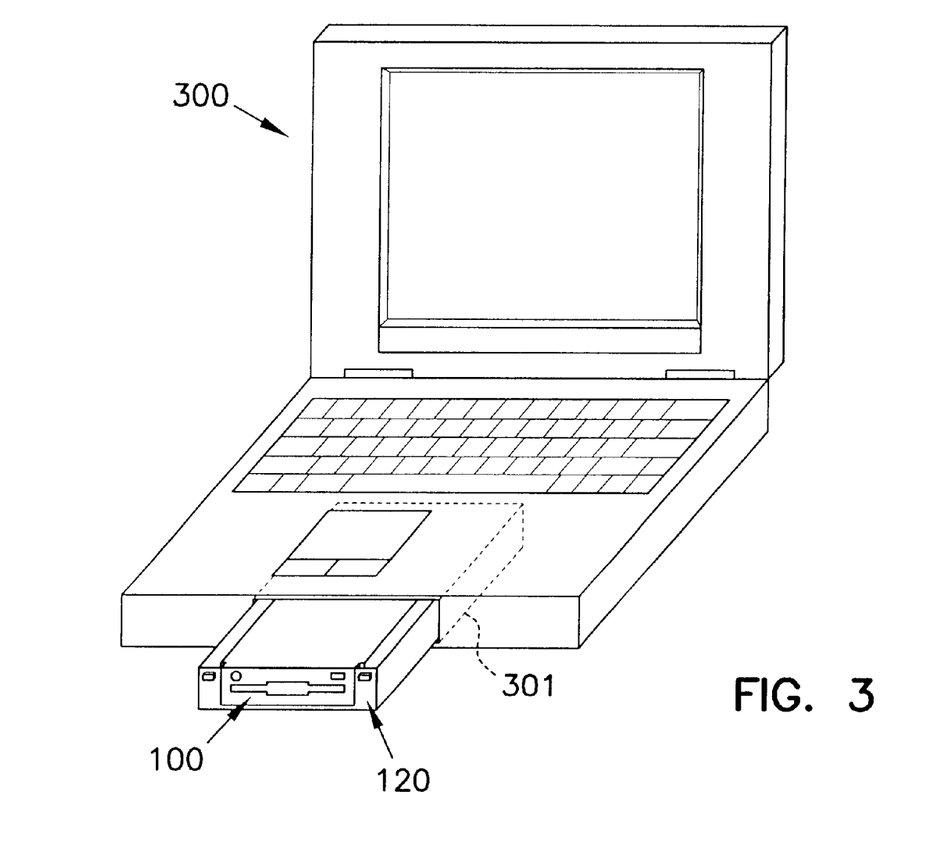
FIG. 3 is a perspective view of the carrier holding the modular floppy disk drive partially inserted into a peripheral option bay of a computer.
Figure 4:
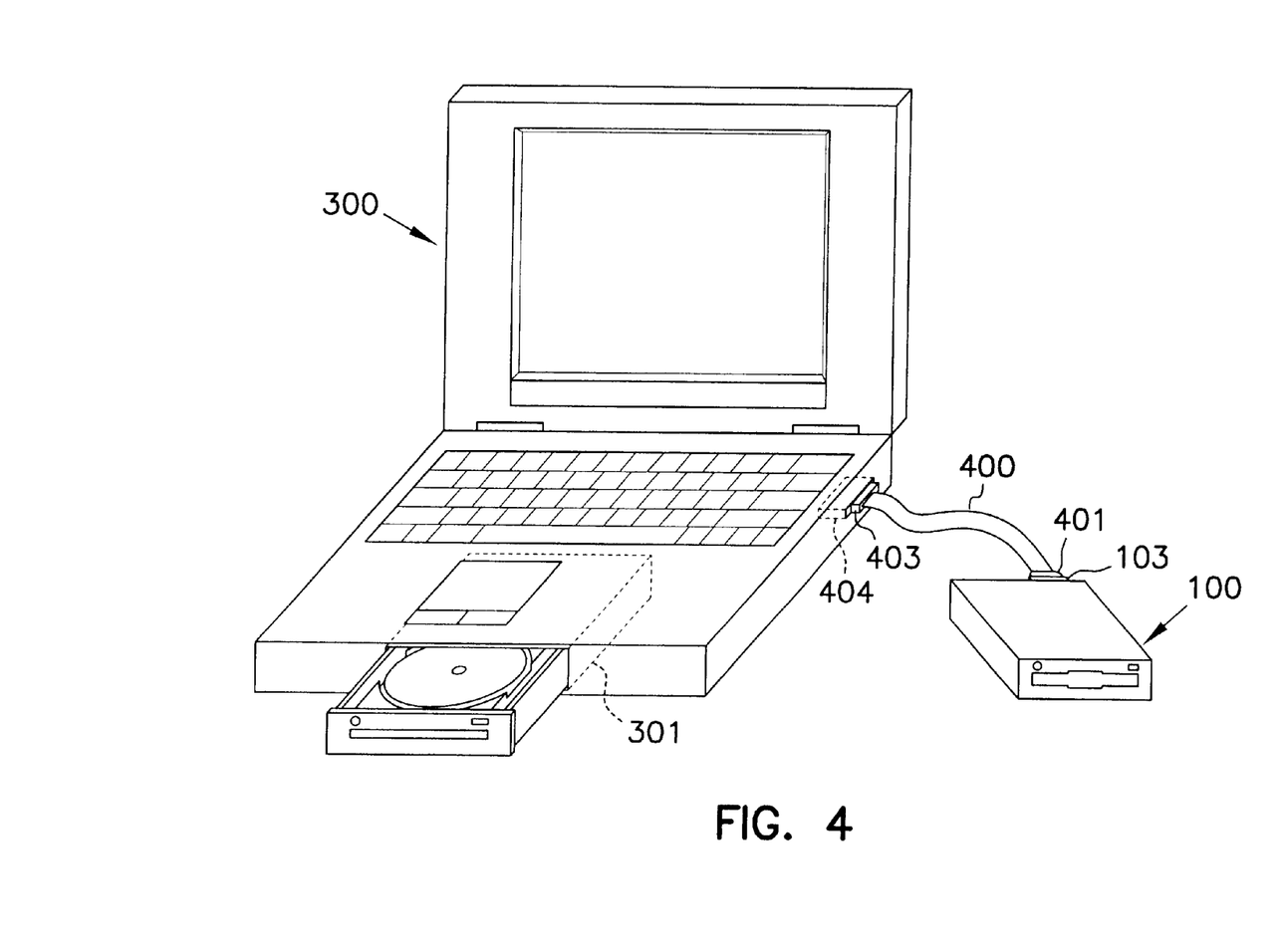
FIG. 4 is a perspective view of the modular floppy disk drive externally connected to the computer through an external port.

FIGS. 3 and 4 illustrate the internal and external use of the modular FDD 100 with laptop computer 300. In FIG. 3, the modular FDD 100 has been placed into the carrier 120, and carrier 120 has then been partially inserted into peripheral option bay 301 which is configured for a removable CD ROM drive. In FIG. 4, a removable CD ROM drive has been inserted into the peripheral option bay 301 in place of modular FDD 100 which is being used as an external device. A cable 400 attaches modular FDD 100 to computer 300 through a connector 401 at one end of cable 400 which couples to the shell adaptor connector 103 and a connector 403 at the other end of cable 400 which couples with an external port 404. In an alternate embodiment the external port 404 is a standard parallel port and the invention uses a standard parallel port connector for connector 403. A further alternate embodiment teaches terminating cable 400 with a DB25 female connector having securing screws as connector 401. In this embodiment, the securing screws on connector 401 screw into the female screwlocks 104 to prevent the accidental disconnection of the cable 400 from the modular FDD. Alternate retention mechanism such as squeeze-torelease or slide latches also serve the same purpose. The use of other interfaces, including proprietary ones, to externally couple the drive to ports designed to interface a peripheral device to the computer will be apparent to those skilled in the art.

Figure 5:
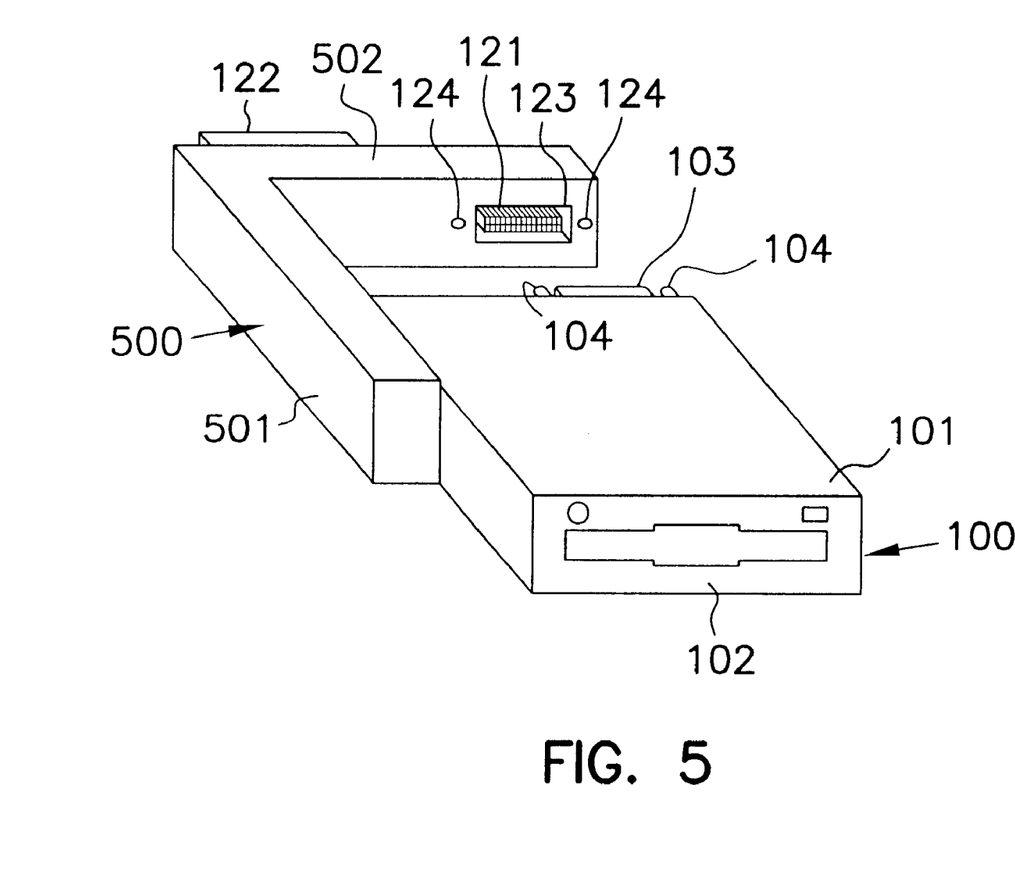
FIG. 5 is a perspective view of the modular floppy disk drive showing it partially inserted into an alternate embodiment of the carrier.

FIG. 5 shows an embodiment of the carrier with a single leg 501 attached to a base cross piece 502 to form a substantially L-shaped carrier 500. The leg 501 is sized so that the combination of the carrier 500 and the modular FDD 100 fit snugly in the peripheral option bay. The physical and electrical connections between the carrier 500 and the modular FDD 100 are the same as in the embodiments detailed above for the U-shaped carrier 120. In one embodiment, the modular FDD 100 is secured in the L-shaped carrier 500 through the interconnecting of the shell adaptor connector 103 on the modular FDD and the inside electrical connector 121 on the carrier. Other alternate embodiments of the L-shaped carrier 500 include the same types of circuits to reduce electromagnetic interference in the modular FDD 100 as described above in conjunction with the U-shaped carrier 120. A mirror image of the L-shaped carrier 500 as shown in FIG. 5 is also within the scope of these embodiments.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A modular floppy drive for internal and external use with a personal computer having a peripheral option bay with an internal drive connector and having an external drive connector for accessing data, the modular floppy drive comprising:
   a shell having a shell adaptor connector;
   a floppy drive unit disposed within the shell comprising a plurality of data/control lines on the floppy drive unit coupled to the shell adaptor connector; and
   a removable carrier formed to fit into the peripheral option bay in the computer, the carrier comprising:
      an open-mouthed slot sized to hold the shell;
      an inside electrical connector on the carrier to couple with the shell adaptor connector on the shell; and
      an outside electrical connector on the carrier coupled to the inside electrical connector, and to further couple with the internal drive connector in the peripheral option bay,
   wherein the internal drive connector comprises a blind-mate connector so that the outside electrical connector on the carrier is guided into proper aligment with the internal drive connector when the carrier is inserted into peripheral option bay.

2. The modular floppy drive of claim 1, wherein the carrier is substantially U-shaped and comprises two opposing legs and a base cross piece attached at one end of the two legs to form the open-mouthed slot.

3. The modular floppy drive of claim 1, further comprising:
   an electrical grounding contact externally mounted on the shell and coupled to a grounding point on the floppy drive unit; and
   a metal plate affixed to the carrier to complete a grounding circuit between the floppy drive unit and the computer chassis when the carrier holding the shell is inserted into the computer bay.

4. The modular floppy drive of claim 1, further comprising:
   a cable to attach the modular drive to the computer as an external device, wherein a first end of the cable is terminated with a first cable connector corresponding to the shell adaptor connector, and a second end of the cable opposite the first end is terminated with a second cable connector corresponding to the external drive connector on the computer.

5. The modular floppy drive of claim 1, wherein the blind-mate connector is chamfered and the outside electrical connector is shaped to match the chamfered blind-mate connector.

6. A modular floppy drive for internal and external use with a personal computer having a peripheral option bay with an internal drive connector and having an external drive connector for accessing data, the modular floppy drive comprising:
   a shell comprising a shell adaptor connector;
   a floppy drive unit disposed within the shell to protect it from damage and contaminants when the modular drive is being used externally, the floppy drive unit comprising:
      a plurality of data/control lines coupled to the shell adaptor connector such that the computer accesses data on a disk inserted in the floppy drive unit through the shell adaptor connector when the modular drive is being used externally or internally in the computer peripheral option bay; and
   a removable carrier formed to fit into the peripheral option bay in the computer, the carrier comprising:
      an open-mouthed slot sized to hold the shell;
      an inside electrical connector on the inside of the carrier to couple with the shell adaptor connector on the shell; and
      an outside electrical connector on the outside of the carrier coupled to the inside electrical connector, wherein the outside electrical connector further couples with the internal drive connector in the peripheral option bay when the carrier is inserted into the peripheral option bays
   wherein the internal drive connector comprises a blind-mate connector so that the outside electrical connector on the carrier is guided into proper alignment with the internal drive connector when the carrier is inserted into the peripheral option bay.

7. The modular floppy drive of claim 6, wherein the carrier is substantially U-shaped and comprises two opposing legs and a base cross piece attached at one end of the two legs to form the open-mouthed slot.

8. The modular floppy drive of claim 6, wherein:
   the computer peripheral option bay conforms to size and mechanical form factor requirements to connect a removable CD ROM drive to the computer;
   the carrier conforms to size and mechanical form factor requirements for the removable CD ROM drive;
   the outside electrical connector conforms to size and mechanical form factor requirements for the removable CD ROM drive; and
   the plurality of data/control lines comprises a plurality of sense lines that carry signals from the floppy drive unit to identify the device as a floppy disk drive to the computer.

9. The modular floppy drive of claim 6, wherein the carrier further comprises at least one latching tab on the carrier to secure the shell when it is inserted into the slot.

10. The modular floppy drive of claim 9, further comprising:
    a latch release button mounted on the carrier and coupled to each latching tab, wherein at least one latching tab is spring-loaded to bias the shell into the middle of the carrier and pressing the latch release button releases the spring loading to permit the shell to be removed from the carrier.

11. The modular floppy drive of claim 9 further comprising:
    a groove formed in the shell to correspond to a latching tab, wherein the latching tab has a different shape such that the shell only inserts into the carrier in one orientation.

12. The modular floppy drive of claim 6, wherein the inside electrical connector is embedded in the carrier forming a recess such that the shell adaptor connector fits tightly in the recess to provide a secure electrical connection between the shell and the carrier.

13. The modular floppy drive of claim 6, wherein the blind-mate connector is chamfered and the outside electrical connector is shaped to match the chamfered, blind-mate connector.

14. The modular floppy drive of claim 6, wherein:
    the shell adaptor connector comprises a shrouded DB25 male connector having a plurality of threaded receptors;
    the inside electrical connector comprises a DB25 female connector; and the carrier further comprises a plurality of receiving holes formed on the inside of the carrier to accept the plurality of threaded receptors.

15. The modular floppy drive of claim 6, further comprising:
an electrical grounding contact externally mounted on the shell and coupled to a grounding point on the floppy drive unit; and
a metal plate affixed to the carrier such that the electrical grounding contact on the shell makes contact with the metal plate when the shell is inserted into the carrier, and a grounding circuit is completed between the floppy drive unit and the computer chassis when the carrier holding the shell is inserted into the computer bay.

16. The modular floppy drive of claim 6, further comprising:
a cable to attach the modular drive to the computer as an external device, wherein a first end of the cable is terminated with a first cable connector corresponding to the shell adaptor connector, and a second end of the cable opposite the first end is terminated with a second cable connector corresponding to the external drive connector on the computer.

17. The modular floppy drive of claim 16, wherein the first cable connector is a DB25 female connector having securing screws.

18. The modular floppy drive of claim 16, wherein the second cable connector is a standard parallel port connector.

19. The modular floppy drive of claim 16, wherein the second cable connector corresponds to an external interface connector on a standard PCMCIA card.

20. A modular floppy drive for internal and external use with a personal computer having a peripheral option bay manufactured to connect removable CD ROM drives to the computer through an internal drive connector and having an external drive connector for accessing data, the modular floppy drive comprising:
a shell comprising a shell adaptor connector;
a floppy drive unit disposed within the shell to protect it from damage and contaminants when the modular drive is being used externally, the floppy drive unit comprising:
a plurality of data/control lines coupled to the shell adaptor connector such that the computer accesses data on a disk inserted in the floppy drive unit through the shell adaptor connector when the modular drive is being used externally or internally in the computer peripheral option bay; and
a removable, substantially U-shaped carrier conforming to size and mechanical form factor requirements for the removable CD ROM drive such that the carrier interfaces with the peripheral option bay, the carrier comprising:
two opposing legs and a base cross piece attached at one end of the two legs forming an open-mouthed slot sized to hold the shell;
an inside electrical connector on the inside of the carrier to couple with the shell adaptor connector on the shell; and
an outside electrical connector on the outside of the carrier coupled to the inside electrical connector, wherein the outside electrical connector further couples with the internal drive connector in the computer peripheral option bay when the carrier is inserted into the peripheral option bay,
wherein the internal drive connector comprises a blind-mate connector so that the outside electrical connector on the carrier is guided into proper alignment with the internal drive connector when the carrier is inserted into the peripheral option bay.

21. The modular floppy drive of claim 20, wherein the blind-mate connector is chamfered and the outside electrical connector is shaped to match the chamfered blind-mate connector.

22. A modular floppy drive for internal and external use with a personal computer having a peripheral option bay with an internal drive connector and having an external drive connector for accessing data, the modular floppy drive comprising:
a shell comprising a shell adaptor connector; and
a floppy drive unit disposed within the shell to protect it from damage and contaminants when the modular drive is being used externally, the floppy drive unit comprising:
a plurality of data/control lines coupled to the shell adaptor connector such that the computer accesses data on a disk inserted in the floppy drive unit through the shell adaptor connector when the modular drive is being used externally or internally in the computer peripheral option bay; and
a removable, substantially L-shaped carrier formed to fit into the peripheral option bay in the computer, the carrier comprising:
a leg and a base cross piece attached at one end of the leg forming a slot having an open mouth, an open side, and sized to hold the shell;
an inside electrical connector on the inside of the carrier to couple with the shell adaptor connector on the shell; and
an outside electrical connector on the outside of the carrier coupled to the inside electrical connector, wherein the outside electrical connector further couples with the internal drive connector in the computer peripheral option bay when the carrier is inserted into the peripheral option bay,
wherein the internal drive connector comprises a blind-mate connector so that the outside electrical connector on the carrier is guided into proper alignment with the internal drive connector when the carrier is inserted into the peripheral option bay.

23. The modular floppy drive of claim 22, wherein the blind-mate connector is chamfered and the outside electrical connector is shaped to match the chamfered blind-mate connector.

24. A modular floppy drive for internal and external use with a personal computer having a peripheral option bay with an internal drive connector comprising a blind-mate connector, and having an external drive connector for accessing data, the modular floppy drive comprising:
a shell having a shell adaptor connector;
a floppy drive unit disposed within the shell comprising a plurality of data/control lines on the floppy drive unit coupled to the shell adaptor connector; and
a removable carrier formed to fit into the peripheral option bay in the computer, the carrier comprising:
an open-mouthed slot sized to hold the shell;
an inside electrical connector on the carrier to couple with the shell adaptor connector on the shell; and
an outside electrical connector on the carrier coupled to the inside electrical connector, and to further couple with blind-mate connector when the carrier is inserted in the peripheral option bay, wherein the outside electrical connector is different from the shell adaptor connector and is shaped such that the blind-mate connector guides the outside electrical connector into proper alignment for coupling.

25. A modular floppy drive for internal and external use with a personal computer having a peripheral option bay with an internal drive connector comprising a blind-mate connector, and having an external drive connector for accessing data, the modular floppy drive comprising:
   a shell comprising a shell adaptor connector;
   a floppy drive unit disposed within the shell to protect it from damage and contaminants when the modular drive is being used externally, the floppy drive unit comprising:
      a plurality of data/control lines coupled to the shell adaptor connector such that the computer accesses data on a disk inserted in the floppy drive unit through the shell adaptor connector when the modular drive is being used externally or internally in the computer peripheral option bay; and
   a removable carrier formed to fit into the peripheral option bay in the computer, the carrier comprising:
      an open-mouthed slot sized to hold the shell;
      an inside electrical connector on the inside of the carrier to couple with the shell adaptor connector on the shell; and
      an outside electrical connector on the carrier coupled to the inside electrical connector, and to further couple with blind-mate connector when the carrier is inserted in the peripheral option bay, wherein the outside electrical connector is different from the shell adaptor connector and is shaped such that the blind-mate connector guides the outside electrical connector into proper alignment for coupling.

26. A modular floppy drive for internal and external use with a personal computer having a peripheral option bay manufactured to connect removable CD ROM drives to the computer through an internal drive connector comprising a blind-mate connector, and having an external drive connector for accessing data, the modular floppy drive comprising:
   a shell comprising a shell adaptor connector;
   a floppy drive unit disposed within the shell to protect it from damage and contaminants when the modular drive is being used externally, the floppy drive unit comprising:
      a plurality of data/control lines coupled to the shell adaptor connector such that the computer accesses data on a disk inserted in the floppy drive unit through the shell adaptor connector when the modular drive is being used externally or internally in the computer peripheral option bay; and
   a removable, substantially U-shaped carrier conforming to size and mechanical form factor requirements for the removable CD ROM drive such that the carrier interfaces with the peripheral option bay, the carrier comprising:
      two opposing legs and a base cross piece attached at one end of the two legs forming an open-mouthed slot sized to hold the shell;
      an inside electrical connector on the inside of the carrier to couple with the shell adaptor connector on the shell; and
      an outside electrical connector on the carrier coupled to the inside electrical connector, and to further couple with blind-mate connector when the carrier is inserted in the peripheral option bay, wherein the outside electrical connector is different from the shell adaptor connector and is shaped such that the blind-mate connector guides the outside electrical connector into proper alignment for coupling.

27. A modular floppy drive for internal and external use with a personal computer having a peripheral option bay with an internal drive connector and having an external drive connector for accessing data, the modular floppy drive comprising:
   a shell comprising a shell adaptor connector; and
   a floppy drive unit disposed within the shell to protect it from damage and contaminants when the modular drive is being used externally, the floppy drive unit comprising:
      a plurality of data/control lines coupled to the shell adaptor connector such that the computer accesses data on a disk inserted in the floppy drive unit through the shell adaptor connector when the modular drive is being used externally or internally in the computer peripheral option bay; and
   a removable, substantially L-shaped carrier formed to fit into the peripheral option bay in the computer, the carrier comprising:
      a leg and a base cross piece attached at one end of the leg forming a slot having an open mouth, an open side, and sized to hold the shell;
      an inside electrical connector on the inside of the carrier to couple with the shell adaptor connector on the shell; and
      an outside electrical connector on the carrier coupled to the inside electrical connector, and to further couple with blind-mate connector when the carrier is inserted in the peripheral option bay, wherein the outside electrical connector is different from the shell adaptor connector and is shaped such that the blind-mate connector guides the outside electrical connector into proper alignment for coupling.

28. A computer system comprising:
   a computer having an external drive connector for accessing data and a peripheral option bay with an internal blind-mate connector; and
   a modular floppy drive for coupling to the computer externally through the external drive connector, and further for coupling to the computer internally through the internal blind-mate connector, the modular floppy drive comprising:
      a shell having a shell adaptor connector;
      a floppy drive unit disposed within the shell to protect it from damage and contaminants when the modular floppy drive is being used externally, the floppy drive unit comprising:
         a plurality of data/control lines coupled to the shell adaptor connector such that the computer accesses data on a disk inserted in the floppy drive unit through the shell adaptor connector when the modular drive is being used externally or internally in the computer peripheral option bay; and
      a removable carrier formed to fit into the peripheral option bay in the computer, the carrier comprising:
         an open-mouthed slot sized to hold the shell;
         an inside electrical connector on the inside of the carrier to couple with the shell adaptor connector on the shell; and
         an outside electrical connector on the outside of the carrier coupled to the inside electrical connector on the inside of the carrier, the outside electrical connector further coupled to the internal blind-mate connector when the carrier is inserted into the peripheral drive bay, wherein the outside electrical connector is different from the shell adaptor connector and is shaped such that the internal blind-mate connector guides the outside electrical connector into proper alignment for coupling.

* * * * *